(12) United States Patent
Jiang et al.

(10) Patent No.: US 12,185,347 B2
(45) Date of Patent: Dec. 31, 2024

(54) SELF-DRIVING TECHNOLOGY-BASED RESOURCE DETERMINING METHOD AND APPARATUS

(71) Applicant: HUAWEI TECHNOLOGIES CO., LTD., Guangdong (CN)

(72) Inventors: Pin Jiang, Shanghai (CN); Yujia Li, Shanghai (CN); Xian Zhang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 743 days.

(21) Appl. No.: 17/407,949

(22) Filed: Aug. 20, 2021

(65) Prior Publication Data
US 2021/0385819 A1    Dec. 9, 2021

Related U.S. Application Data

(63) Continuation of application No. PCT/CN2020/071846, filed on Jan. 13, 2020.

(30) Foreign Application Priority Data

Feb. 21, 2019  (CN) .......................... 201910129983.1

(51) Int. Cl.
*H04W 72/541* (2023.01)
*G01S 7/00* (2006.01)
(Continued)

(52) U.S. Cl.
CPC ........... *H04W 72/541* (2023.01); *G01S 7/003* (2013.01); *H04B 10/116* (2013.01);
(Continued)

(58) Field of Classification Search
CPC .............. H04W 72/541; H04W 72/02; H04W 72/0446; H04W 72/0453; H04W 92/18;
(Continued)

(56) References Cited

U.S. PATENT DOCUMENTS

| 10,168,418 B1* | 1/2019 | Al-Stouhi ............. G01S 13/931 |
| 2016/0061935 A1 | 3/2016 | Mccloskey et al. |

(Continued)

FOREIGN PATENT DOCUMENTS

| CN | 105430751 A | 3/2016 |
| CN | 105516214 A | 4/2016 |

(Continued)

OTHER PUBLICATIONS

CATT, "Further discussion on resource allocation mechanism in PC5-based V2V," 3GPP TSG RAN WG1 Meeting #83bis, R1-156605, Anaheim, USA, Nov. 15- 22, 2015, 7 pages.

(Continued)

*Primary Examiner* — Shon G Foley
(74) *Attorney, Agent, or Firm* — Fish & Richardson P.C.

(57) ABSTRACT

Methods for determining a self-driving technology-based resource and communications are provided. One example method includes that a server determines a first time-frequency resource and a first location of the first vehicle; determines a first area range in which the first vehicle is located; when a second vehicle exists in the first area range, and a second time-frequency resource of the second vehicle is the same as the first time-frequency resource, determines, from time-frequency resources in the first area range, a third time-frequency resource including an idle time-frequency resource; and the server sends the third time-frequency resource to the first vehicle, and the first vehicle performs laser signal transmission by using the third time-frequency resource.

10 Claims, 6 Drawing Sheets

(51) Int. Cl.
| | |
|---|---|
| *H04B 10/116* | (2013.01) |
| *H04B 10/50* | (2013.01) |
| *H04W 4/46* | (2018.01) |
| *H04W 72/02* | (2009.01) |
| *H04W 72/0446* | (2023.01) |
| *H04W 72/0453* | (2023.01) |
| *H04W 92/18* | (2009.01) |

(52) U.S. Cl.
CPC ............ *H04B 10/503* (2013.01); *H04W 4/46* (2018.02); *H04W 72/02* (2013.01); *H04W 72/0446* (2013.01); *H04W 72/0453* (2013.01); *H04W 92/18* (2013.01)

(58) Field of Classification Search
CPC ....... H04W 4/46; H04W 72/044; H04W 4/02; H04W 4/44; H04W 24/04; H04W 72/53; H04B 10/503; H04B 10/116; G01S 7/003; G01S 13/765; G01S 17/931
See application file for complete search history.

(56) References Cited

U.S. PATENT DOCUMENTS

| | | |
|---|---|---|
| 2017/0082737 A1 | 3/2017 | Slobodyanyuk et al. |
| 2019/0080612 A1* | 3/2019 | Weissman ............. G01S 13/758 |

FOREIGN PATENT DOCUMENTS

| | | |
|---|---|---|
| CN | 105517059 A | 4/2016 |
| CN | 106341771 A | 1/2017 |
| CN | 106792885 A | 5/2017 |
| CN | 107666648 A | 2/2018 |
| KR | 20140137865 A | 12/2014 |

OTHER PUBLICATIONS

Kim et al., "An experiment of mutual interference between automotive LIDAR scanners," 2015 12th International Conference on Information Technology—New Generations, Apr. 2015, 6 pages.

Knox, "Modeling an Interference-Tolerant LIDAR System," Submitted to the Undergraduate Research Scholars program at Texas A&M University, May 2018, 45 pages.

Kunert, "The EU project MOSARIM: A general overview of project objectives and conducted work," Proceedings of the 9th European Radar Conference, Amsterdam, The Netherlands, Oct. 31-Nov. 2, 2012, 6 pages.

Office Action issued in Chinese Application No. 201910129983.1 on Feb. 3, 2021, 31 pages (with English translation).

PCT International Search Report and Written Opinion issued in International Application No. PCT/CN2020/071846 on Apr. 13, 2020, 16 pages (with English translation).

Extended European Search Report issued in European Application No. 20758746.0 on Jan. 25, 2022, 10 pages.

* cited by examiner

SELF-DRIVING TECHNOLOGY-BASED RESOURCE DETERMINING METHOD AND APPARATUS

CROSS-REFERENCE TO RELATED APPLICATIONS

This application is a continuation of International Application No. PCT/CN2020/071846, filed on Jan. 13, 2020, which claims priority to Chinese Patent Application No. 201910129983.1, filed on Feb. 21, 2019. The disclosures of the aforementioned applications are hereby incorporated by reference in their entireties.

TECHNICAL FIELD

Embodiments of this application relate to the field of communications technologies, and in particular, to a self-driving technology-based resource determining method and apparatus.

BACKGROUND

With rapid development of science and technology, self-driving technologies for vehicles become more popular. To implement accurate self-driving of a vehicle, a light detection and ranging (light detection and ranging, LIDAR) system may be installed on the vehicle. The LIDAR system includes laser ranging, a global positioning system (global positioning system, GPS), and an inertial navigation system (inertial navigation system, INS). The LIDAR system determines a distance between a target area and a current vehicle by determining a value of duration during which a laser signal transmitted by a laser is reflected back to the laser after the target area is irradiated by the laser signal. An angle between the current vehicle and the target area is determined based on a height of the laser, a laser scanning angle, and a vehicle driving direction identified by the INS, and the vehicle is tracked and positioned by using the GPS, to implement accurate self-driving of the vehicle.

As a quantity of self-driving vehicles increases, light detection and ranging systems on at least two vehicles whose physical locations are adjacent to each other may perform laser signal transmission by using a same time-frequency resource. Consequently, a light detection and ranging system considers a laser signal transmitted by another light detection and ranging system as a reflected signal, causing interference. In view of this, a current technology proposes a solution for avoiding mutual interference between a plurality of light detection and ranging systems. In this solution, a LIDAR system performs transmission based on slots. The LIDAR system performs laser signal transmission only in a specified slot, and does not perform laser signal transmission in other time periods. First, the LIDAR system receives common reference clock signals (for example, satellite clock signals such as clock signals sent by the GPS, BeiDou, and GLONASS), and synchronizes a local clock with a common reference clock. The LIDAR system divides synchronized time into frames, and divides each frame into a plurality of slots. The LIDAR system obtains a unique identifier (LIDAR system identification number, LSIN) of the LIDAR system, and the LIDAR system calculates, based on the LSIN of the LIDAR system and a hash algorithm, a slot used when the LIDAR system performs laser signal transmission.

After clock synchronization is performed, as shown in FIG. 1, start time T0 of frames of all LIDAR systems is the same. However, due to factors such as a speed of light, a propagation delay, and a relative time drift, LIDAR systems that perform laser signal transmission in two adjacent slots still interfere with each other. Therefore, to resolve this problem, a guard slot may be set in which no LIDAR system is allowed to perform laser signal transmission. As shown in FIG. 1, start time of a frame is T0, end time of the frame is T1, an LSIN1 and an LSIN3 are slots in which a LIDAR 1 performs laser signal transmission, GRD is a guard slot, and an LSIN2 and an LSIN4 are slots in which a LIDAR 2 performs laser signal transmission.

In the foregoing existing solution, slots calculated by at least two LIDAR systems based on LSINs of the at least two LIDAR systems and the hash algorithm may be the same. If the at least two LIDAR systems whose physical locations are adjacent to each other perform laser signal transmission by using a same slot, mutual interference still occurs.

SUMMARY

Embodiments of this application provide a self-driving technology-based resource determining method and apparatus, to resolve a problem that mutual interference occurs when a plurality of vehicles whose physical locations are adjacent to each other perform laser signal transmission.

According to a first aspect, a resource determining method is provided. A first vehicle may identify a first time-frequency resource used when the first vehicle currently performs laser signal transmission and a current first location of the first vehicle, and send the identified first time-frequency resource and first location to a server configured to manage different vehicles.

The server may receive the first time-frequency resource used when the first vehicle currently performs laser signal transmission and the current first location of the first vehicle, where the first time-frequency resource and the first location are sent by the first vehicle. The server may use the received first time-frequency resource and first location as a determined first time-frequency resource used when the first vehicle performs laser signal transmission and a determined first location of the first vehicle.

The server may prestore a location included in each area range. Certainly, the location included in each area range may alternatively be stored in a third-party device or a storage medium. To avoid related interference that occurs when the first vehicle and another vehicle whose physical locations are adjacent to each other perform laser signal transmission, the server may determine, based on the first location of the first vehicle, a first area range in which the first vehicle is located, that is, determine a first area range to which the first location belongs.

The server or the third-party device may further determine whether other vehicles different from the first vehicle exist in the first area range; if other vehicles exist in the first area range, determine a time-frequency resource used when each of the other vehicles performs laser signal transmission, and contrast the time-frequency resource used when each of the other vehicles performs laser signal transmission with the first time-frequency resource, to determine whether there is a second time-frequency resource that is the same as the first time-frequency resource; and if there is a second time-frequency resource that is the same as the first time-frequency resource, determine that a second vehicle exists in the first area range. The second time-frequency resource used when the second vehicle performs laser signal transmission is the same as the first time-frequency resource used when the first vehicle performs laser signal transmission. In each area range, there is a time-frequency resource that is corresponding to the area range and that is used for laser signal transmission. The server may determine a third time-frequency resource from time-frequency resources in the first area range that are used for laser signal transmission, where the third time-frequency resource includes an idle time-frequency resource. The server sends the determined third time-frequency resource to the first vehicle, where the third time-frequency resource is used by the first vehicle to perform laser signal transmission.

The first vehicle receives the third time-frequency resource sent by the server. The third time-frequency resource includes the idle time-frequency resource in the time-frequency resources, in the first area range in which the first vehicle is located, that are used for laser signal transmission. After receiving the third time-frequency resource sent by the server, the first vehicle may perform switching on the time-frequency resource used for laser signal transmission. Specifically, the first vehicle may switch from using the first time-frequency resource to perform laser signal transmission to using the third time-frequency resource to perform laser signal transmission.

The server may determine, based on the first location reported by the first vehicle, the first area range in which the first vehicle is located; and when determining, based on the first time-frequency resource reported by the first vehicle, that the second vehicle existing in the first area range in which the first vehicle is located causes signal interference to the first vehicle, select an idle time-frequency resource and send the selected idle time-frequency resource to the first vehicle for use. This can better avoid mutual interference caused when a plurality of vehicles whose physical locations are adjacent to each other perform laser signal transmission.

In a possible implementation, the server may first determine idle time-frequency resources from the time-frequency resources in the first area range that are used for laser signal transmission, and then select, from the idle time-frequency resources, a time-frequency resource with minimum interference as the third time-frequency resource. The server selects the idle time-frequency resource with the minimum interference for the first vehicle, so that the first vehicle can more effectively avoid interfering with another vehicle when performing laser signal transmission.

In a possible implementation, the server may determine, as the third time-frequency resource, all idle time-frequency resources in the time-frequency resources in the first area range that are used for laser signal transmission. In this case, after receiving the third time-frequency resource, the first vehicle may select time-frequency resources from the third time-frequency resource to perform laser signal transmission. The time-frequency resource selected by the first vehicle from the third time-frequency resource is referred to as a target time-frequency resource. That the first vehicle switches from using the first time-frequency resource to perform laser signal transmission to using the third time-frequency resource to perform laser signal transmission may be specifically: The first vehicle switches from using the first time-frequency resource to perform laser signal transmission to using the target time-frequency resource to perform laser signal transmission. That the first vehicle selects the target time-frequency resource may be: The first vehicle selects, from the third time-frequency resource, any time-frequency resource as the target time-frequency resource, or selects, from the third time-frequency resource, a time-frequency resource with minimum interference as the target time-frequency resource.

The server sends the idle time-frequency resources to the first vehicle, and the first vehicle may select, based on a requirement of the first vehicle, the target time-frequency resource from the idle time-frequency resources to perform laser signal transmission, to avoid mutual interference between the first vehicle and another vehicle.

In a possible implementation, after selecting the target time-frequency resource from the third time-frequency resource, the first vehicle may further report, to the server, the target time-frequency resource selected by the first vehicle to perform laser signal transmission. After receiving the target time-frequency resource that is selected by the first vehicle and that is reported by the first vehicle, the server stores the target time-frequency resource, so that the server can accurately record a time-frequency resource used when each vehicle performs laser signal transmission, and can accurately determine the idle time-frequency resources conveniently. In this way, the server allocates proper time-frequency resources to vehicles to perform laser signal transmission.

In a possible implementation, a time-frequency resource used when a vehicle performs laser signal transmission includes information about a slot identifier, a cycle, and a frequency. Determining whether two time-frequency resources are the same may be determining whether slot identifiers, cycles, and frequencies included in the two time-frequency resources are respectively the same. If all of three determining results are yes, it is determined that the two time-frequency resources are the same. Determining whether the second time-frequency resource is the same as the first time-frequency resource may be specifically determining whether a first slot identifier included in the first time-frequency resource is the same as a second slot identifier included in the second time-frequency resource, determining whether a first cycle included in the first time-frequency resource is the same as a second cycle included in the second time-frequency resource, and determining whether a first frequency included in the first time-frequency resource is the same as a second frequency included in the second time-frequency resource. If all of three determining results are yes, it is determined that the first time-frequency resource is the same as the second time-frequency resource; or if at least one of three determining results is no, it is determined that the first time-frequency resource is different from the second time-frequency resource.

A process of determining whether the two time-frequency resources are the same may be performed by the server, or may be performed by the third-party device.

In a possible implementation, the first vehicle may store an identification cycle used for identifying a time-frequency resource and a location. When determining that the identification cycle used for identifying a time-frequency resource and a location currently arrives, the first vehicle may start to identify the first time-frequency resource used by the first vehicle to currently perform laser signal transmission and the current first location of the first vehicle.

In a possible implementation, the first vehicle may determine whether the first vehicle enters a new area range. When determining that the first vehicle enters a new area range, the first vehicle may start to identify the first time-frequency resource used by the first vehicle to currently perform laser signal transmission and the current first location of the first vehicle.

In a possible implementation, the first vehicle may determine whether the first vehicle is about to leave or is leaving the first area range in which the first vehicle is currently located. When determining that the first vehicle leaves the first area range in which the first vehicle is currently located, the first vehicle may send, to the server, a leave notification message including information about the location of the first vehicle or an identifier of the first area range in which the first vehicle is located. After receiving the leave notification message sent by the first vehicle, the server may determine that the first vehicle leaves the first area range, and release the first time-frequency resource used when the first vehicle currently performs laser signal transmission. In other words, the first time-frequency resource is used as an idle time-frequency resource in the time-frequency resources in the first area range that are used for laser signal transmission.

In a possible implementation, the first vehicle may send the first time-frequency resource used when the first vehicle performs laser signal transmission and the first location of the first vehicle to the server by using a cellular network, and then the server may receive, by using the cellular network, the first time-frequency resource and the first location that are reported by the first vehicle.

In a possible implementation, the server may deliver the third time-frequency resource by using a roadside unit, and then the first vehicle may receive the third time-frequency resource that is sent by the server by using the roadside unit.

According to a second aspect, a resource determining system is provided. The system includes a server and a first vehicle. The first vehicle is configured to: identify a first time-frequency resource used when the first vehicle performs laser signal transmission and a first location of the first vehicle, and send the first time-frequency resource and the first location to the server. The server is configured to: determine, based on the first location, a first area range in which the first vehicle is located; when a second vehicle exists in the first area range, and a second time-frequency resource used when the second vehicle performs laser signal transmission is the same as the first time-frequency resource, determine a third time-frequency resource from time-frequency resources in the first area range that are used for laser signal transmission; and send the third time-frequency resource to the first vehicle, where the third time-frequency resource includes an idle time-frequency resource. The first vehicle is further configured to: receive the third time-frequency resource sent by the server, and switch from using the first time-frequency resource to perform laser signal transmission to using the third time-frequency resource to perform laser signal transmission.

The server may determine, based on the first location reported by the first vehicle, the first area range in which the first vehicle is located; and when determining, based on the first time-frequency resource reported by the first vehicle, that the second vehicle existing in the first area range in which the first vehicle is located causes signal interference to the first vehicle, select an idle time-frequency resource and send the selected idle time-frequency resource to the first vehicle for use. This can better avoid mutual interference caused when a plurality of vehicles whose physical locations are adjacent to each other perform laser signal transmission.

In a possible implementation, the server may specifically use, as the third time-frequency resource, all idle time-frequency resources in the time-frequency resources in the first area range that are used for laser signal transmission; or determine idle time-frequency resources from the time-frequency resources in the first area range that are used for laser signal transmission, and select, from the idle time-frequency resources, a time-frequency resource with minimum interference as the third time-frequency resource.

In a possible implementation, if the third time-frequency resource is all the idle time-frequency resources in the time-frequency resources in the first area range that are used for laser signal transmission, the first vehicle may be specifically configured to: select a target time-frequency resource from the third time-frequency resource, and switch from using the first time-frequency resource to perform laser signal transmission to using the target time-frequency resource to perform laser signal transmission.

In a possible implementation, the first vehicle may further be configured to report, to the server, the target time-frequency resource selected by the first vehicle to perform laser signal transmission. After receiving the target time-frequency resource that is selected by the first vehicle and that is reported by the first vehicle, the server stores the target time-frequency resource, so that the server can accurately record a time-frequency resource used when each vehicle performs laser signal transmission, and can accurately determine the idle time-frequency resources conveniently. In this way, the server allocates proper time-frequency resources to vehicles to perform laser signal transmission.

In a possible implementation, a time-frequency resource includes a slot identifier, a cycle, and a frequency. The server may further be configured to: determine whether a first slot identifier included in the first time-frequency resource is the same as a second slot identifier included in the second time-frequency resource, determine whether a first cycle included in the first time-frequency resource is the same as a second cycle included in the second time-frequency resource, and determine whether a first frequency included in the first time-frequency resource is the same as a second frequency included in the second time-frequency resource; and if all of three determining results are yes, determine that the first time-frequency resource is the same as the second time-frequency resource; or if at least one of three determining results is no, determine that the first time-frequency resource is different from the second time-frequency resource.

According to a third aspect, a resource determining apparatus is provided. The apparatus has function modules for implementing the method in any one of the foregoing aspects or the possible implementations of the aspects. The function modules may be implemented by using hardware, or may be implemented by hardware executing corresponding software. The hardware or the software includes one or more modules corresponding to the foregoing functions.

In a possible implementation, the apparatus may be a chip or an integrated circuit.

In a possible implementation, when the apparatus is the server in the foregoing system, the apparatus may specifically include a processor and a transceiver. The transceiver is configured to receive and send data. The processor is configured to: determine a first time-frequency resource used when a first vehicle performs laser signal transmission and a first location of the first vehicle, and determine, based on the first location, a first area range in which the first vehicle is located; when a second vehicle exists in the first area range, and a second time-frequency resource used when the second vehicle performs laser signal transmission is the same as the first time-frequency resource, determine a third time-frequency resource from time-frequency resources in the first area range that are used for laser signal transmission, where the third time-frequency resource includes an idle time-frequency resource; and send the third time-frequency resource to the first vehicle by using the transceiver, where the third time-frequency resource is used by the first vehicle to perform laser signal transmission.

In a possible implementation, for determining the third time-frequency resource from the time-frequency resources in the first area range that are used for laser signal transmission, the processor may be specifically configured to: use, as the third time-frequency resource, all idle time-frequency resources in the time-frequency resources in the first area range that are used for laser signal transmission; or determine idle time-frequency resources from the time-frequency resources in the first area range that are used for laser signal transmission, and select, from the idle time-frequency resources, a time-frequency resource with minimum interference as the third time-frequency resource.

In a possible implementation, a time-frequency resource includes a slot identifier, a cycle, and a frequency. The processor may be specifically configured to: determine whether a first slot identifier included in the first time-frequency resource is the same as a second slot identifier included in the second time-frequency resource, determine whether a first cycle included in the first time-frequency resource is the same as a second cycle included in the second time-frequency resource, and determine whether a first frequency included in the first time-frequency resource is the same as a second frequency included in the second time-frequency resource; and if all of three determining results are yes, determine that the first time-frequency resource is the same as the second time-frequency resource; or if at least one of three determining results is no, determine that the first time-frequency resource is different from the second time-frequency resource.

In a possible implementation, for determining the first time-frequency resource used when the first vehicle performs laser signal transmission and the first location of the first vehicle, the processor may be specifically configured to: receive, by using the transceiver, the first time-frequency resource used when the first vehicle performs laser signal transmission and the first location of the first vehicle, where the first time-frequency resource and the first location are reported by the first vehicle.

In a possible implementation, when the apparatus is a terminal device in the vehicle in the foregoing system, the apparatus may include a processor, a transceiver, and a laser, where the processor is configured to: identify a first time-frequency resource used when the apparatus performs laser signal transmission and a first location of the apparatus, send the first time-frequency resource and the first location to a server by using the transceiver, and receive a third time-frequency resource sent by the server, where the third time-frequency resource is sent by the server to the apparatus after the following case occurs: the server determines, based on the first location, a first area range in which the apparatus is located; and when a second vehicle exists in the first area range, and a second time-frequency resource used when the second vehicle performs laser signal transmission is the same as the first time-frequency resource, the server determines the third time-frequency resource from time-frequency resources in the first area range that are used for laser signal transmission, where the third time-frequency resource includes an idle time-frequency resource; and the processor may further be configured to control the laser to switch from using the first time-frequency resource to perform laser signal transmission to using the third time-frequency resource to perform laser signal transmission.

In a possible implementation, the third time-frequency resource is all idle time-frequency resources in the time-frequency resources in the first area range that are used for laser signal transmission; or the third time-frequency resource is a time-frequency resource with minimum interference among idle time-frequency resources in the time-frequency resources in the first area range that are used for laser signal transmission.

In a possible implementation, if the third time-frequency resource is all the idle time-frequency resources in the time-frequency resources in the first area range that are used for laser signal transmission, for controlling the laser to switch from using the first time-frequency resource to perform laser signal transmission to using the third time-frequency resource to perform laser signal transmission, the processor may be specifically configured to: select a target time-frequency resource from the third time-frequency resource, and control the laser to switch from using the first time-frequency resource to perform laser signal transmission to using the target time-frequency resource to perform laser signal transmission.

In a possible implementation, the processor may further be configured to report, to the server by using the transceiver, the target time-frequency resource selected by the processor to perform laser signal transmission.

According to a fourth aspect, a resource determining apparatus is provided. The apparatus includes a processing module, a sending module, and a receiving module. The processing module may be implemented by the processor in any one of the third aspect or the possible implementations of the third aspect, and the sending module and the receiving module may be implemented by the transceiver in any one of the third aspect or the possible implementations of the third aspect. The processing module may perform the method in any one of the foregoing aspects or the possible implementations of the aspects based on message sending and receiving functions of the sending module and the receiving module.

According to a fifth aspect, a computer-readable storage medium is provided. The computer storage medium stores computer-readable instructions; and when a computer reads and executes the computer-readable instructions, the computer is enabled to perform the method in any one of the foregoing aspects or the possible implementations of the aspects.

According to a sixth aspect, a computer program product is provided. When a computer reads and executes the computer program product, the computer is enabled to perform the method in any one of the foregoing aspects or the possible implementations of the aspects.

According to a seventh aspect, a chip is provided. The chip is coupled to a memory, and is configured to read and execute software programs stored in the memory, to implement the method in any one of the foregoing aspects or the possible implementations of the aspects.

DESCRIPTION OF EMBODIMENTS

The following describes in detail the embodiments of this application with reference to accompanying drawings.

The service scenario described in the embodiments of this application is intended to describe the technical solutions in the embodiments of this application more clearly, and do not constitute a limitation on the technical solutions provided in the embodiments of this application. Persons of ordinary skill in the art may know that: With the emergence of new service scenarios, the technical solutions provided in the embodiments of this application are also applicable to similar technical problems.

In addition, the word "example" in the embodiments of this application is used to represent giving an example, an illustration, or a description. Any embodiment or implementation solution described as an "example" in this application should not be explained as being more preferred or having more advantages than another embodiment or implementation solution. Exactly, "for example" is used to present a concept in a specific manner.

Figure 1:
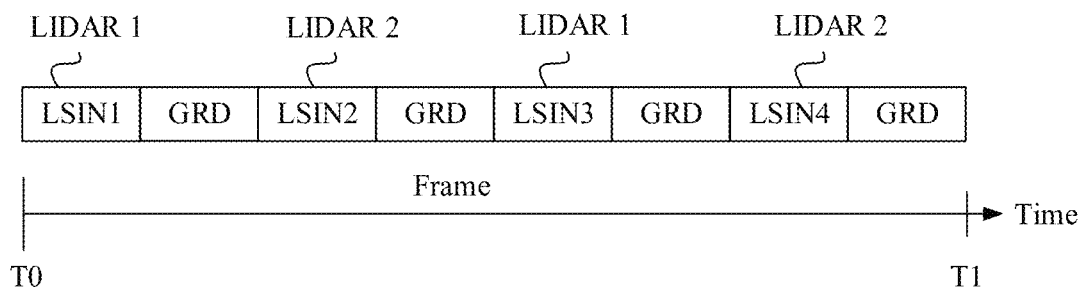
FIG. 1 is a schematic diagram of slots for laser signal transmission provided in a current technology.
Figure 2:
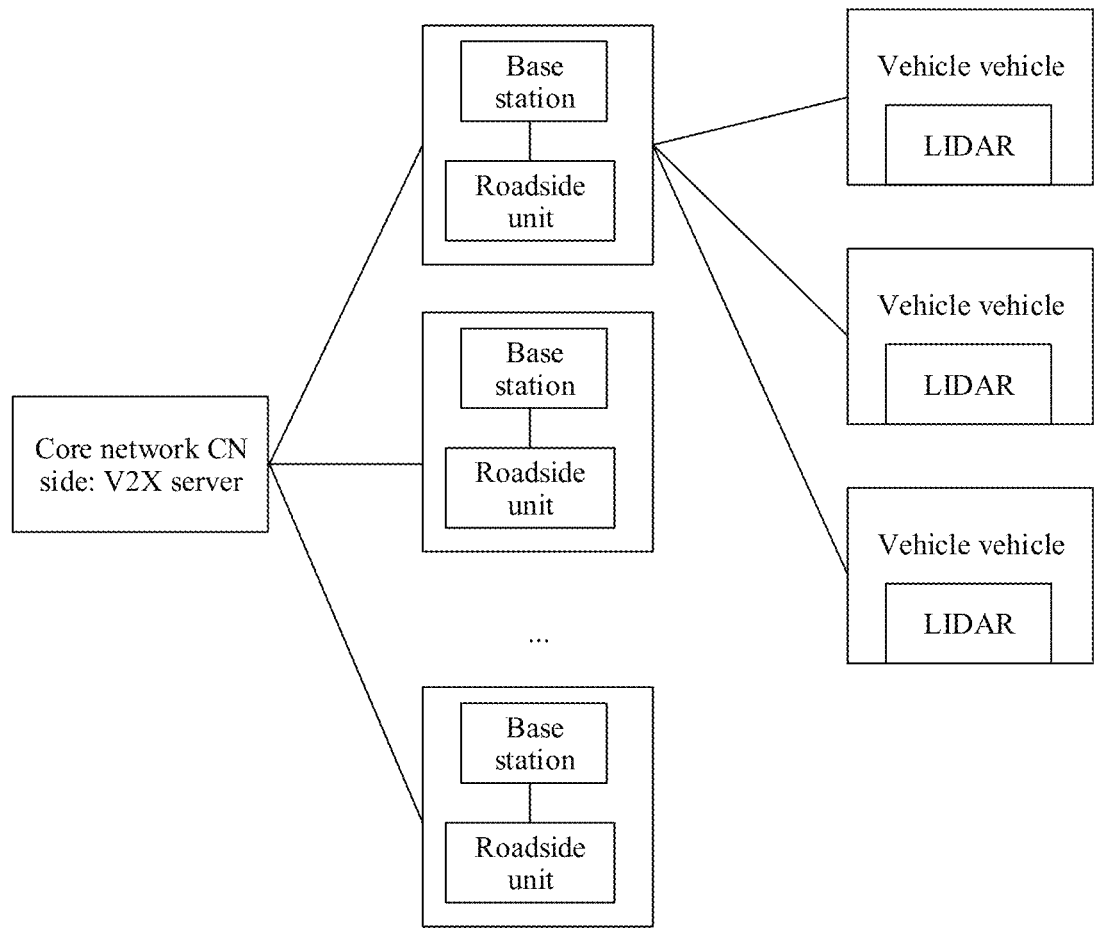
FIG. 2 is a schematic diagram of a resource determining application scenario according to an embodiment of this application.
Figure 3:
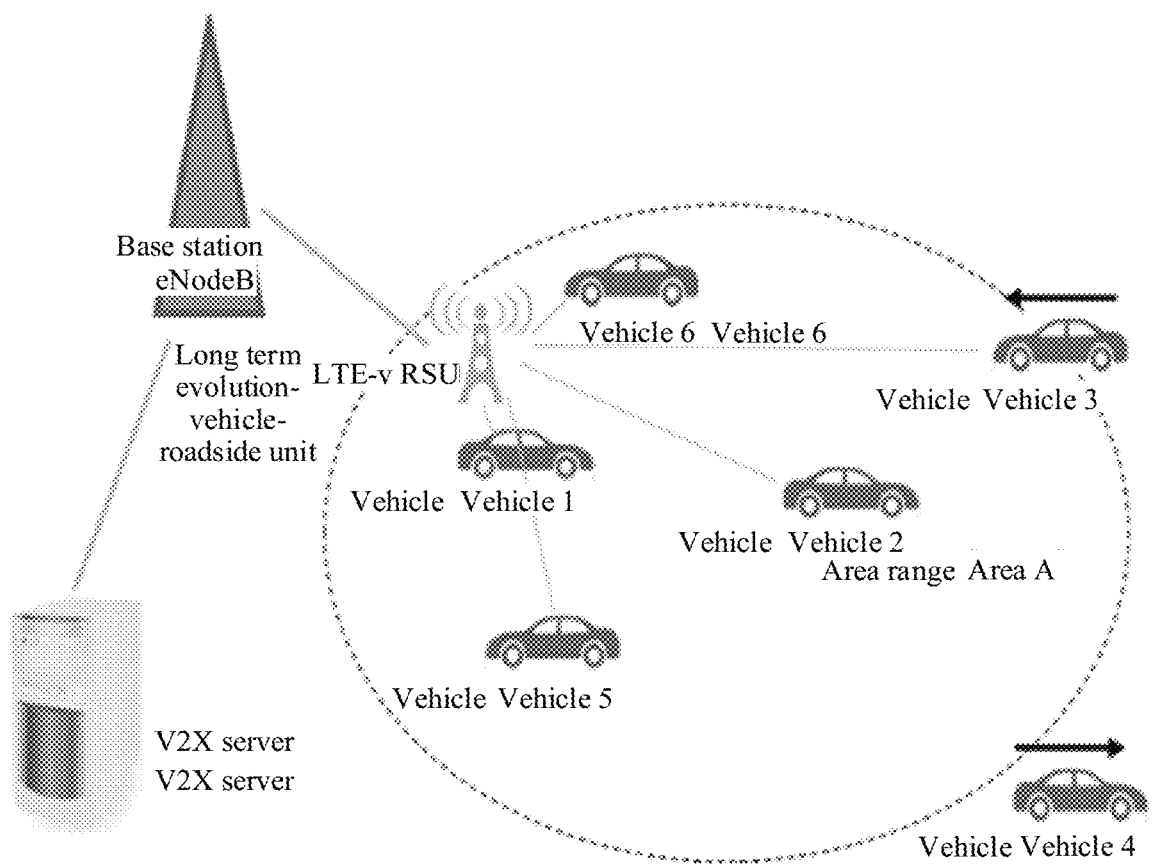
FIG. 3 is a schematic diagram of a resource determining application scenario according to an embodiment of this application.

For ease of understanding the embodiments of this application, the following describes application scenarios of this application. As shown in FIG. 2 and FIG. 3, a vehicle (Vehicle) on which a light detection and ranging (light detection and ranging, LIDAR) system is installed may communicate with a vehicle-to-everything (Vehicle to Everything, V2X) server (Server) on a core network (core network, CN) side by using a roadside unit (road side unit, RSU) or a base station. The V2X server is configured to manage different vehicles and transportation infrastructures. The roadside unit includes but is not limited to a long term evolution-vehicle-roadside unit (long term evolution-vehicle-road side unit, LTE-V-RSU). The base station includes but is not limited to a base station of a cellular network. The base station of the cellular network includes but is not limited to an eNodeB. The base station may directly communicate with the V2X server through a backhaul network, and the roadside unit may communicate with the V2X server by using the base station.

In this application, a signal coverage area of one base station or one roadside unit may be considered as an area range (area). In this application, it may be considered that different area ranges do not overlap. A vehicle on which a LIDAR system is installed may enter an area range or leave an area range during driving. Due to driving of vehicles, at a moment, a plurality of vehicles may exist in an area range, or one vehicle or no vehicle exists in an area range. As shown in FIG. 3, a vehicle 1, a vehicle 2, a vehicle 5, and a vehicle 6 are all located in an area range A, a vehicle 3 is about to enter the area range A, and a vehicle 4 is about to leave the area range A. Vehicles in one area range may be considered as vehicles whose physical locations are adjacent to each other. Each vehicle may report, to a server (for example, a V2X server) by using a base station (for example, an eNodeB), a location of the vehicle and a time-frequency resource used when the vehicle performs laser signal transmission. The V2X server may manage a plurality of vehicles located in a plurality of area ranges, based on locations and time-frequency resources reported by the vehicles; and allocate, to a vehicle in each area range, a time-frequency resource used for laser signal transmission, to ensure that no mutual signal interference occurs when a vehicle in one area range performs laser signal transmission by using a time-frequency resource allocated to the vehicle. A vehicle on which a LIDAR system is installed may be a self-driving vehicle, and in this case, this application may provide a resource determining solution proposed based on a self-driving technology.

Connection lines in FIG. 2 and FIG. 3 only indicate that communication can be performed, but cannot be considered as physical connections.

The following describes a resource determining process in this application by using a specific embodiment. The specific embodiment is applied to the following service scenario: A first vehicle reports, to a server, a location of the first vehicle and a time-frequency resource used when the first vehicle performs laser signal transmission, and the server ensures, for the first vehicle based on the location and the time-frequency resource, that no laser signal interference occurs when a plurality of vehicles whose physical locations are adjacent to a physical location of the first vehicle perform laser signal transmission. For example, the specific embodiment may be applied to service scenarios shown in FIG. 2 and FIG. 3, the server in this process may be the V2X server in FIG. 2 or FIG. 3, and the first vehicle in this process may be any one of the vehicle 1, the vehicle 2, the vehicle 3, the vehicle 4, the vehicle 5, or the vehicle 6 in FIG. 3.

Figure 4A:
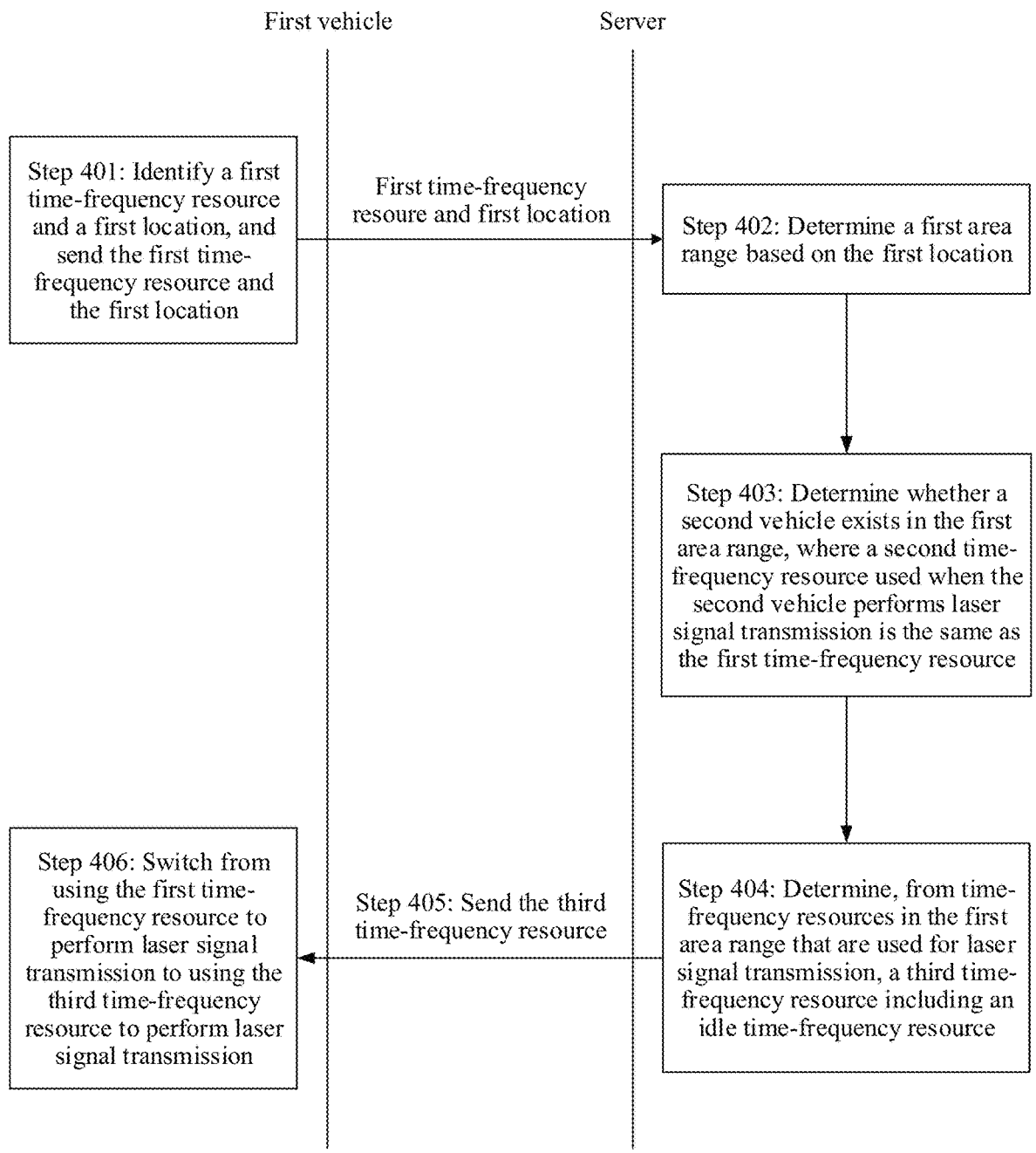
FIG. 4A is a schematic diagram of a resource determining process according to an embodiment of this application.

As shown in FIG. 4A, this application provides a schematic diagram of a self-driving technology-based resource determining process.

Step 401: A first vehicle identifies a first time-frequency resource used when the first vehicle performs laser signal transmission and information about a first location of the first vehicle, and sends the identified first time-frequency resource and the identified information about the first location to a server.

For example, each vehicle may identify information about a current location of the vehicle and a time-frequency resource used when the vehicle currently performs laser signal transmission. For ease of description, the location of the first vehicle is referred to as the first location, and the time-frequency resource used when the first vehicle performs laser signal transmission is referred to as the first time-frequency resource. After identifying the first time-frequency resource used when the first vehicle performs laser signal transmission and the first location of the first vehicle, the first vehicle may send the identified first time-frequency resource and first location to the server.

Each vehicle and the server may pre-agree on an occasion for identifying a time-frequency resource and a location, that is, pre-agree on a manner of reporting a time-frequency resource and a location by the vehicle. The manner may be, for example, periodical reporting, or may be reporting under a specific condition.

For example, the first vehicle may store a cycle used for identifying a time-frequency resource and a location. When determining that the identification cycle used for identifying a time-frequency resource and a location currently arrives, the first vehicle may identify the first time-frequency resource used when the first vehicle performs laser signal transmission and the first location of the first vehicle, and report the first time-frequency resource and the first location to the server. In this case, the first vehicle can periodically report a time-frequency resource used by the first vehicle to currently perform laser signal transmission and a current location of the first vehicle to the server.

For example, the first vehicle may have a capability of determining whether the first vehicle enters a new area range. When determining that the first vehicle enters a new area range, the first vehicle may identify the first time-frequency resource used when the first vehicle performs laser signal transmission and the first location of the first vehicle, and report the first time-frequency resource and the first location to the server. In this case, the first vehicle reports a time-frequency resource used by the first vehicle to currently perform laser signal transmission and a current location of the first vehicle to the server only when the first vehicle enters a new area range.

The first vehicle may communicate with the server by using a cellular network, including but not limited to communicating with the server through a Uu interface of the cellular network. That the first vehicle sends the first time-frequency resource and the first location to the server may be: The first vehicle sends the first time-frequency resource and the first location to the server by using the cellular network.

Step 402: The server receives the first location and the first time-frequency resource that are sent by the first vehicle, and determines, based on the first location of the first vehicle, a first area range in which the first vehicle is located.

The server may prestore a location included in each area range. Certainly, the location included in each area range may alternatively be stored in a third-party device or a storage medium. To avoid mutual interference that occurs when the first vehicle and another vehicle whose physical locations are adjacent to each other perform laser signal transmission, the server or the third-party device may determine, based on the first location of the first vehicle, the first area range in which the first vehicle is located; and subsequently determines, based on a time-frequency resource used when the another vehicle in the first area range performs laser signal transmission, whether there is another vehicle that interferes with the first vehicle.

Step 403: The server determines whether a second vehicle exists in the first area range, where a second time-frequency resource used when the second vehicle performs laser signal transmission is the same as the first time-frequency resource used when the first vehicle performs laser signal transmission; and if a second vehicle exists in the first area range, performs step 404.

The server or the third-party device may further determine whether other vehicles different from the first vehicle exist in the first area range; if other vehicles exist in the first area range, determine a time-frequency resource used when each of the other vehicles performs laser signal transmission, and contrast the time-frequency resource used when each of the other vehicles performs laser signal transmission with the first time-frequency resource, to determine whether there is a second time-frequency resource that is the same as the first time-frequency resource; and if there is a second time-frequency resource that is the same as the first time-frequency resource, determine that a second vehicle exists in the first area range. The second time-frequency resource used when the second vehicle performs laser signal transmission is the same as the first time-frequency resource used when the first vehicle performs laser signal transmission, that is, mutual interference exists between the second vehicle and the first vehicle when the second vehicle and the first vehicle perform laser signal transmission.

When the server receives, for the first time, the first time-frequency resource and the first location that are reported by the first vehicle, the server, the third-party device, or the storage medium may store, specific to an identifier of the first vehicle, the first time-frequency resource and the first location that are reported by the first vehicle, that is, store a correspondence among the identifier of the vehicle, the time-frequency resource, and the location. After a first location and a first time-frequency resource that are reported by the first vehicle are subsequently received, the first location may be used to update the currently stored location of the first vehicle, and the first time-frequency resource may be used to update the currently stored time-frequency resource used by the first vehicle to perform laser signal transmission. Updating the location and the time-frequency resource may be specifically updating the location and the time-frequency resource in the correspondence among the identifier of the vehicle, the time-frequency resource, and the location.

After receiving the first location reported by the first vehicle, the server may further determine the first area range in which the first vehicle is located, and the server, the storage medium, or the third-party device stores a correspondence between the identifier of the first vehicle and an identifier of the first area range in which the first vehicle is located. After a location reported by the first vehicle is subsequently received, an area range in which the first vehicle is located may further be determined again, and the identifier of the area range in the currently stored correspondence may be updated.

After determining the first area range, the server may determine, based on a stored correspondence between an identifier of a vehicle and an identifier of an area range, whether other vehicles different from the first vehicle exist in the first area range; and if other vehicles exist in the first area range, identify, based on a stored correspondence among an identifier of a vehicle, a time-frequency resource used for laser signal transmission, and a location, a time-frequency resource corresponding to each of the other vehicles, to determine whether the time-frequency resource corresponding to each of the other vehicles is the same as the first time-frequency resource. A vehicle that is located in the first area range and whose time-frequency resource used during laser signal transmission is the same as the first time-frequency resource is referred to as a second vehicle. If a second vehicle exists, a resource needs to be reallocated to the first vehicle, to avoid signal interference. If no second vehicle exists, it is considered that another vehicle that interferes with the first vehicle does not exist in the first area range, and the server may not reallocate a resource to the first vehicle.

Generally, the server sequentially allocates, based on a sequence in which vehicles enter an area range, time-frequency resources to the vehicles that enter the area range. For a vehicle located in one area range for a long time, the server may allocate a time-frequency resource to the vehicles only once.

Regardless of whether the first vehicle periodically reports a time-frequency resource and a location to the server, or reports a time-frequency resource and a location when determining that the first vehicle enters a new area range, to accurately allocate a time-frequency resource to the first vehicle, the server may determine, after receiving a first location reported by the first vehicle, a first area range in which the first vehicle is located, and determine whether the first area range is a new area range that the first vehicle enters. If the first area range is the new area range that the first vehicle enters, the server may further determine whether a second vehicle exists in the first area range. If the first area range is not the new area range that the first vehicle enters, that is, the first vehicle is still in an original area range, the server may not perform a process of determining whether a second vehicle exists in the first area range.

A specific process of determining, by the server, whether the first area range is the new area range that the first vehicle enters may be: After receiving the first time-frequency resource and the first location that are reported by the first vehicle, the server may determine whether an area range is stored for the first vehicle. If no area range is stored, it may be considered that the first vehicle reports the first time-frequency resource and the first location for the first time, that is, the first vehicle enters the new area range. In this case, after determining the first area range in which the first vehicle is located, the server may store a correspondence between the identifier of the first vehicle and an identifier of the determined first area range, and store the correspondence among the identifier of the first vehicle, the first time-frequency resource, and the first location.

If an area range is stored for the first vehicle, it indicates that the first vehicle has been located in an area before performing reporting. The server may determine whether the first area range in which the first location currently reported by the first vehicle is located is the same as the area range stored for the first vehicle. If the two area ranges are the same, it indicates that the first vehicle has not entered a new area range and is still in the original area range, and a time-frequency resource does not need to be allocated again. If the two area ranges are different, it indicates that the first vehicle has entered a new area range, that is, the first vehicle enters the determined first area range for the first time. In this case, after determining the first area range in which the first vehicle is located, the server may update the identifier of the area range in the stored correspondence between the identifier of the first vehicle and the identifier of the area range based on the determined first area range, and may further use the first location and the first time-frequency resource to update the location and the time-frequency resource in the stored correspondence among the identifier of the first vehicle, the time-frequency resource, and the location.

It is assumed that the vehicle periodically reports a time-frequency resource and a location to the server. As shown in FIG. 3, the vehicle 1/vehicle 2/vehicle 5/vehicle 6 may have reported time-frequency resources and locations to the server in the area range A for two or more times. When the vehicle performs reporting for the first time, the server may determine, based on a reported location, that the vehicle 1/vehicle 2/vehicle 5/vehicle 6 have entered a new area range, that is, the area range A, and allocate time-frequency resources to the vehicle 1/vehicle 2/vehicle 5/vehicle 6. When the vehicle performs reporting for the second time, the server does not need to allocate time-frequency resources to the vehicle 1/vehicle 2/vehicle 5/vehicle 6.

To reduce use of computing resources, the server can agree with the first vehicle as follows: The first vehicle reports a first time-frequency resource and a first location to the server only when the first vehicle enters a new area range, and once the server receives the time-frequency resource and the location that are reported by the first vehicle, the server can determine whether signal interference exists between the first vehicle and another vehicle in the first area range in which the first vehicle is located, that is, determine whether a second vehicle exists in the first area range.

Step 404: The server determines a third time-frequency resource from time-frequency resources in the first area range that are used for laser signal transmission, where the third time-frequency resource includes an idle time-frequency resource.

In each area range, there is a time-frequency resource that is corresponding to the area range and that is used for laser signal transmission. Generally, time-frequency resources in each area range that are used for laser signal transmission may be the same.

When determining that the second vehicle that causes signal interference to the first vehicle exists in the first area range, the server may determine the third time-frequency resource from the time-frequency resources in the first area range that are used for laser signal transmission, where the third time-frequency resource includes the idle time-frequency resource. The server sends the determined third time-frequency resource to the first vehicle, where the third time-frequency resource is used by the first vehicle to perform laser signal transmission.

In FIG. 3, the vehicle 3 is about to enter the area range A, and the vehicle 4 is about to leave the area range A. Each vehicle may report, to the server, a location of the vehicle and a time-frequency resource used when the vehicle performs laser signal transmission. The vehicle may perform reporting periodically, or may perform reporting when determining that the vehicle enters a new area range. The vehicle 3 reports, to the server, a location of the vehicle and a time-frequency resource used when the vehicle performs laser signal transmission. The server determines, based on the location reported by the vehicle 3, that the vehicle 3 is located in the area range A. Based on time-frequency resources used when other vehicles currently located in the area range A, that is, the vehicle 1, the vehicle 2, the vehicle 5, and the vehicle 6, perform laser signal transmission, the server determines, from time-frequency resources that are used for laser signal transmission and that are corresponding to the area range A, a resource other than the time-frequency resources occupied by the vehicle 1, the vehicle 2, the vehicle 5, and the vehicle 6, as an idle time-frequency resource, and sends the determined idle time-frequency resource to the vehicle 3.

For determining the third time-frequency resource including the idle time-frequency resource, the server may use, as the third time-frequency resource, all idle time-frequency resources in the time-frequency resources in the first area range that are used for laser signal transmission; may select, as the third time-frequency resource, any part of idle time-frequency resources in the time-frequency resources in the first area range that are used for laser signal transmission; or may select, from idle time-frequency resources, a specific time-frequency resource as the third time-frequency resource.

The server uses the specific time-frequency resource as the third time-frequency resource. For example, the server may first identify the idle time-frequency resources in the time-frequency resources in the first area range that are used for laser signal transmission, and select, from the idle time-frequency resources, a time-frequency resource with minimum interference as the third time-frequency resource. The server selects the idle time-frequency resource with the minimum interference for the first vehicle, so that the first vehicle can better avoid interfering with another vehicle when performing laser signal transmission.

Step 405: The server sends the third time-frequency resource to the first vehicle.

The first vehicle may communicate with the server by using a roadside unit, including but not limited to communicating with the server through a PC5 interface of the roadside unit. The server may deliver the time-frequency resource to the first vehicle by using the roadside unit. Then, the first vehicle may receive the third time-frequency resource that is sent by the server by using the roadside unit.

Step 406: The first vehicle receives the third time-frequency resource sent by the server, and switches from using the first time-frequency resource to perform laser signal transmission to using the third time-frequency resource to perform laser signal transmission.

The first vehicle receives the third time-frequency resource sent by the server. The third time-frequency resource includes the idle time-frequency resource in the time-frequency resources, in the first area range in which the first vehicle is located, that are used for laser signal transmission. After receiving the third time-frequency resource sent by the server, the first vehicle may perform switching on the time-frequency resource used for laser signal transmission. Specifically, the first vehicle switches from using the first time-frequency resource to perform laser signal transmission to using the third time-frequency resource to perform laser signal transmission.

If the server uses different manners to determine the third time-frequency resource, corresponding processes performed by the first vehicle when the first vehicle receives the third time-frequency resource are slightly different.

For example, the server may determine, as the third time-frequency resource, all or any part of idle time-frequency resources in the time-frequency resources in the first area range that are used for laser signal transmission. In this case, after receiving the third time-frequency resource, the first vehicle may select a time-frequency resource from the third time-frequency resource to perform laser signal transmission. The time-frequency resource selected by the first vehicle from the third time-frequency resource is referred to as a target time-frequency resource. That the first vehicle switches from using the first time-frequency resource to perform laser signal transmission to using the third time-frequency resource to perform laser signal transmission may be specifically: The first vehicle switches from using the first time-frequency resource to perform laser signal transmission to using the target time-frequency resource to perform laser signal transmission. That the first vehicle selects the target time-frequency resource may be: The first vehicle selects, from the third time-frequency resource, any time-frequency resource as the target time-frequency resource, or selects, from the third time-frequency resource, a time-frequency resource with minimum interference as the target time-frequency resource.

The server sends the idle time-frequency resources to the first vehicle, and the first vehicle may select, based on a requirement of the first vehicle, the target time-frequency resource from the idle time-frequency resources to perform laser signal transmission, to avoid signal interference between the first vehicle and another vehicle. After selecting the target time-frequency resource from the third time-frequency resource, the first vehicle may further report, to the server, the target time-frequency resource selected by the first vehicle to perform laser signal transmission.

The server receives the target time-frequency resource that is selected by the first vehicle and that is reported by the first vehicle, and uses the target time-frequency resource to update the currently stored time-frequency resource corresponding to the first vehicle, so that the server can accurately record a time-frequency resource used when each vehicle currently performs laser signal transmission, and can accurately determine the idle time-frequency resources conveniently. In this way, the server allocates proper time-frequency resources to vehicles to perform laser signal transmission.

For example, the server may first determine the idle time-frequency resources from the time-frequency resources in the first area range that are used for laser signal transmission, and then select, from the idle time-frequency resources, a time-frequency resource with minimum interference as the third time-frequency resource.

To reduce use of computing resources, the server can agree with the first vehicle as follows: The first vehicle reports a first time-frequency resource and a first location to the server only when the first vehicle enters a new area range. In this case, if the server sends the time-frequency resource that is with the minimum interference among the idle time-frequency resources and that is used as the third time-frequency resource to the first vehicle. Because the first vehicle no longer reports a time-frequency resource, after the server completes the sending, the server may use the determined third time-frequency resource to update the currently stored time-frequency resource of the first vehicle.

The first vehicle may determine whether the first vehicle is about to leave or is leaving the first area range in which the first vehicle is currently located. It is assumed that the first vehicle reports a first time-frequency resource and a first location to the server only when the first vehicle enters a new area range. To enable the server to determine an idle time-frequency resource in each area range more accurately, when determining that the first vehicle leaves the first area range in which the first vehicle is currently located, the first vehicle may further send, to the server, a leave notification message including the information about the location of the first vehicle or the identifier of the first area range in which the first vehicle is located. After receiving the leave notification message sent by the first vehicle, the server determines that the first vehicle leaves the first area range, and releases the first time-frequency resource used when the first vehicle currently performs laser signal transmission. In other words, the first time-frequency resource is used as an idle time-frequency resource in the time-frequency resources in the first area range that are used for laser signal transmission.

The server can use different manners to determine the third time-frequency resource. To make the first vehicle clear about a manner used by the server to determine the third time-frequency resource, the server and the first vehicle may pre-agree on how to determine the third time-frequency resource; or when sending a notification message of the third time-frequency resource to the first vehicle, the server may include, in the notification message, information indicating the manner of determining the third time-frequency resource. Alternatively, the first vehicle may send the time-frequency resource determining manner required by the first vehicle to the server in advance. For example, the requirement may be: The idle time-frequency resource with the minimum interference may be specified by the server without selection performed by the first vehicle; or the first vehicle needs to perform selection, and the server allocates only some or all of the idle time-frequency resources, and subsequently the server may determine the third time-frequency resource for the first vehicle based on the requirement of the first vehicle.

In this application, a time-frequency resource used by a vehicle to perform laser signal transmission includes a slot identifier. Determining whether two time-frequency resources are the same may be determining whether slot identifiers, cycles, and frequencies included in the two time-frequency resources are respectively the same. If the slot identifiers, the cycles, and the frequencies included in the two time-frequency resources are respectively the same, it is determined that the two time-frequency resources are the same.

A slot identifier, a cycle, and a frequency included in the first time-frequency resource are referred to as a first slot identifier, a first cycle, and a first frequency, respectively. A slot identifier, a cycle, and a frequency included in the second time-frequency resource are referred to as a second slot identifier, a second cycle, and a second frequency, respectively. Determining whether the second time-frequency resource is the same as the first time-frequency resource may be specifically determining whether the first slot identifier included in the first time-frequency resource is the same as the second slot identifier included in the second time-frequency resource, determining whether the first cycle included in the first time-frequency resource is the same as the second cycle included in the second time-frequency resource, and determining whether the first frequency included in the first time-frequency resource is the same as the second frequency included in the second time-frequency resource. If all of three determining results are yes, it is determined that the first time-frequency resource is the same as the second time-frequency resource; or if at least one of three determining results is no, it is determined that the first time-frequency resource is different from the second time-frequency resource.

A process of determining whether the two time-frequency resources are the same may be performed by the server, or may be performed by the third-party device.

Figure 4B:
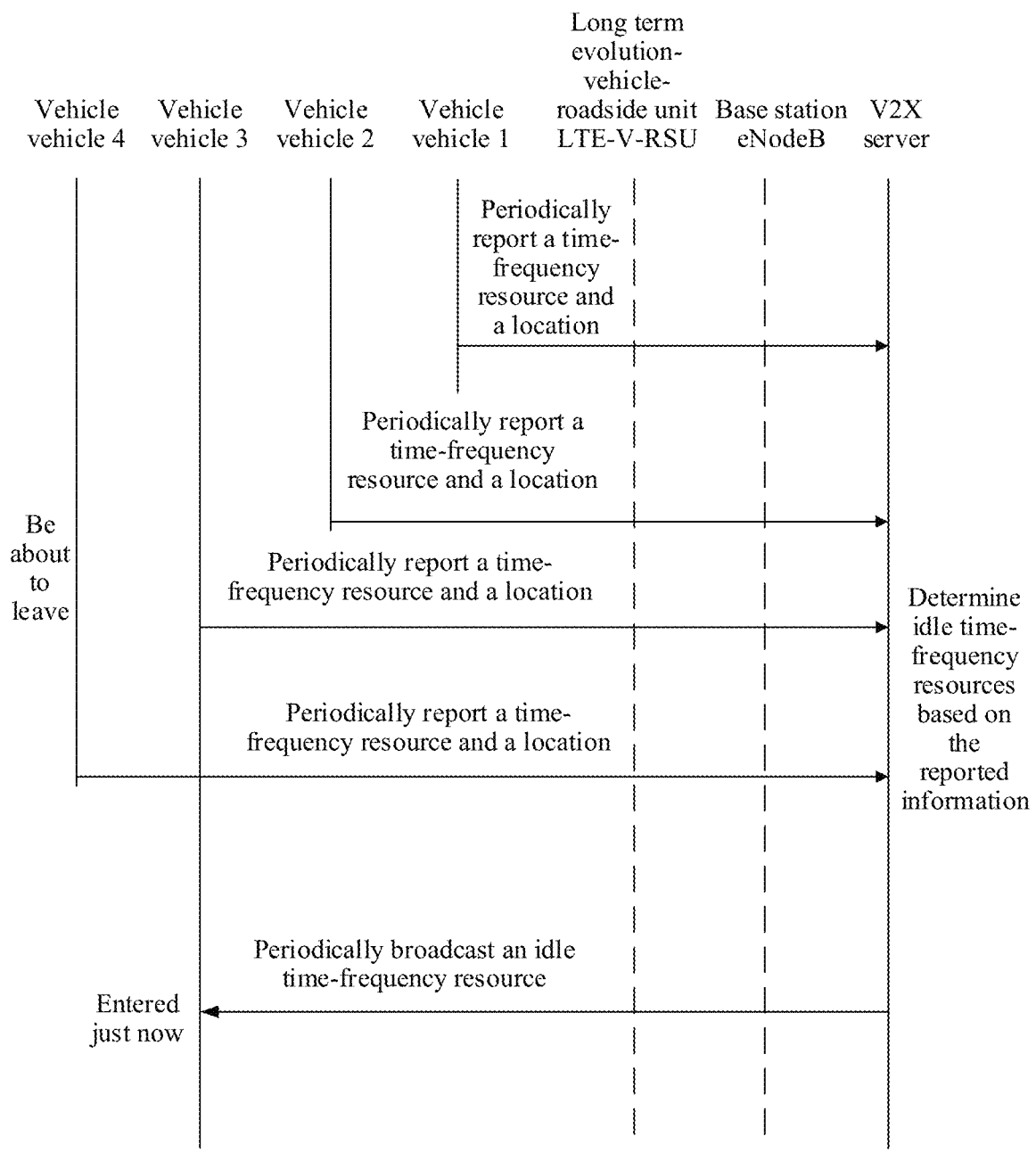
FIG. 4B is a schematic diagram of a resource determining process according to an embodiment of this application.

As shown in FIG. 4B, a vehicle 1 and a vehicle 2 are located in an area range, a vehicle 4 is about to leave the area range, and a vehicle 3 is about to enter the area range. All of the vehicle 1, the vehicle 2, the vehicle 3, and the vehicle 4 can periodically report respective locations and time-frequency resources to a V2X server. The V2X server determines that the vehicle 3 is about to enter the area range, determines, based on information reported by each vehicle, time-frequency resources used by vehicles located in the area range, determines idle time-frequency resources through calculation, and broadcasts the idle time-frequency resources to the vehicle 3 through a PC5 interface. In one case, the V2X server assists in selecting a time-frequency resource used for laser signal transmission. The V2X server may broadcast all the idle time-frequency resources to the vehicle 3. The time-frequency resource used for laser signal transmission is selected on a vehicle side. To be specific, the vehicle 3 selects a target time-frequency resource from the time-frequency resources broadcast by the V2X server, and switches from using a time-frequency resource used by the vehicle 3 to currently perform laser signal transmission to using the target time-frequency resource. In another case, the V2X server determines a selected time-frequency resource used for laser signal transmission. The V2X server may select, from all the idle time-frequency resources, a time-frequency resource with minimum interference, and broadcast the selected time-frequency resource to the vehicle 3. The vehicle 3 switches from using a time-frequency resource used by the vehicle 3 to currently perform laser signal transmission to using the time-frequency resource broadcast by the V2X server. The V2X server may communicate with the vehicle by using an eNodeB or an LTE-V-RSU.

Before performing laser signal transmission by using a time-frequency resource, a vehicle may further receive a general-purpose clock signal, and perform clock synchronization on a LIDAR system of the vehicle by using the general-purpose clock signal. The general-purpose clock signal is a clock signal common to a plurality of LIDAR systems.

Figure 5:
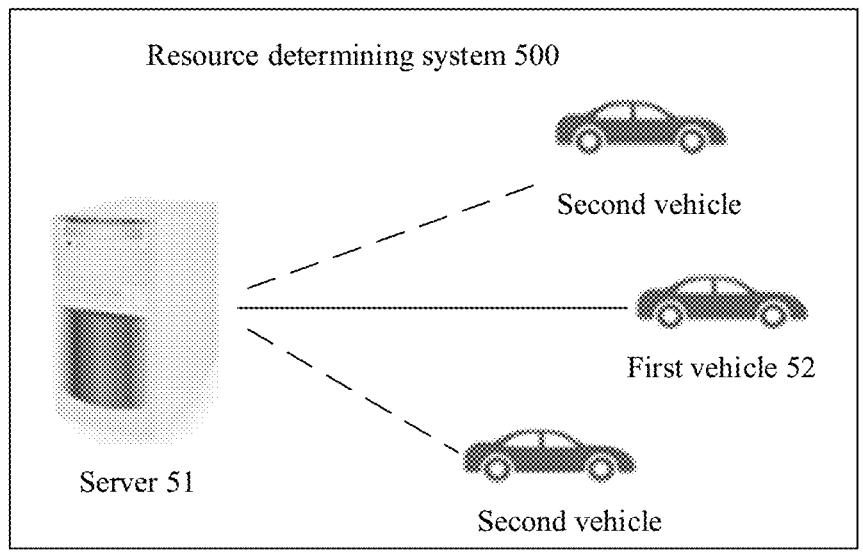
FIG. 5 is a schematic diagram of a resource determining system according to an embodiment of this application.

Based on a same inventive concept as the foregoing resource determining method, as shown in FIG. 5, an embodiment of this application further provides a resource determining system. The system includes a server 51 and a first vehicle 52. The server 51 may be the V2X server in FIG. 2 or FIG. 3, and the first vehicle 52 may be any one of the vehicle 1, the vehicle 2, a vehicle 3, the vehicle 4, the vehicle 5, or the vehicle 6 in FIG. 3.

The first vehicle 52 is configured to: identify a first time-frequency resource used when the first vehicle performs laser signal transmission and a first location of the first vehicle, and send the first time-frequency resource and the first location to the server 51;

the server 51 is configured to: determine, based on the first location, a first area range in which the first vehicle is located; when a second vehicle exists in the first area range, and a second time-frequency resource used when the second vehicle performs laser signal transmission is the same as the first time-frequency resource, determine a third time-frequency resource from time-frequency resources in the first area range that are used for laser signal transmission; and send the third time-frequency resource to the first vehicle 52, where the third time-frequency resource includes an idle time-frequency resource; and the first vehicle 52 is further configured to: receive the third time-frequency resource sent by the server 51, and switch from using the first time-frequency resource to perform laser signal transmission to using the third time-frequency resource to perform laser signal transmission.

For example, the server 51 is specifically configured to: use, as the third time-frequency resource, all idle time-frequency resources in the time-frequency resources in the first area range that are used for laser signal transmission; or determine idle time-frequency resources from the time-frequency resources in the first area range that are used for laser signal transmission, and select, from the idle time-frequency resources, a time-frequency resource with minimum interference as the third time-frequency resource.

For example, if the third time-frequency resource is all the idle time-frequency resources in the time-frequency resources in the first area range that are used for laser signal transmission, the first vehicle 52 is specifically configured to: select a target time-frequency resource from the third time-frequency resource, and switch from using the first time-frequency resource to perform laser signal transmission to using the target time-frequency resource to perform laser signal transmission. For example, the first vehicle 52 is further configured to report, to the server 51, the target time-frequency resource selected by the first vehicle 52 to perform laser signal transmission.

A time-frequency resource includes a slot identifier, a cycle, a frequency, and the like. If a second vehicle exists in the first area range, for determining whether the second time-frequency resource used when the second vehicle performs laser signal transmission is the same as the first time-frequency resource, the server 51 may specifically determine whether a first slot identifier included in the first time-frequency resource is the same as a second slot identifier included in the second time-frequency resource, determine whether a first cycle included in the first time-frequency resource is the same as a second cycle included in the second time-frequency resource, and determine whether a first frequency included in the first time-frequency resource is the same as a second frequency included in the second time-frequency resource; and if all of three determining results are yes, determine that the first time-frequency resource is the same as the second time-frequency resource; or if at least one of three determining results is no, determine that the first time-frequency resource is different from the second time-frequency resource.

Figure 6:
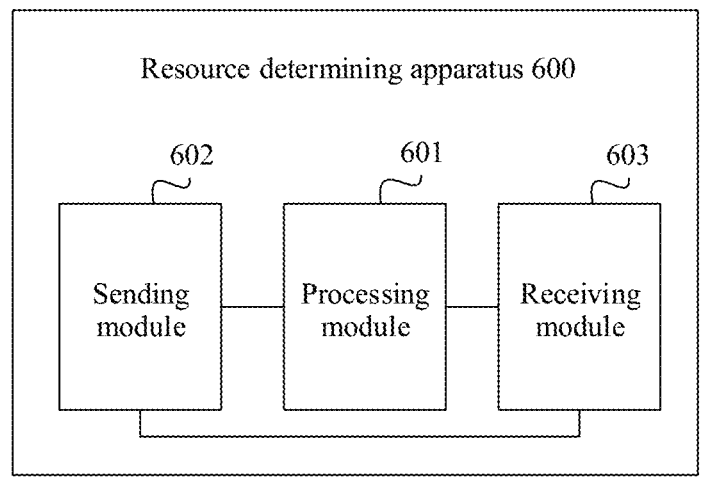
FIG. 6 is a schematic diagram of a resource determining apparatus according to an embodiment of this application.

Based on a same inventive concept as the foregoing resource determining method, as shown in FIG. 6, an embodiment of this application further provides a resource determining apparatus 600. The resource determining apparatus 600 is configured to perform operations in FIG. 2, FIG. 3, FIG. 4A, and FIG. 4B performed by the server in the foregoing resource determining method.

The resource determining apparatus 600 includes a processing module 601, a sending module 602, and a receiving module 603.

For example, the processing module 601 is configured to: determine a first time-frequency resource used when a first vehicle performs laser signal transmission and a first location of the first vehicle, and determine, based on the first location, a first area range in which the first vehicle is located; and when a second vehicle exists in the first area range, and a second time-frequency resource used when the second vehicle performs laser signal transmission is the same as the first time-frequency resource, determine a third time-frequency resource from time-frequency resources in the first area range that are used for laser signal transmission, where the third time-frequency resource includes an idle time-frequency resource; and the sending module 602 is configured to send the third time-frequency resource to the first vehicle, where the third time-frequency resource is used by the first vehicle to perform laser signal transmission.

For example, for determining the third time-frequency resource from the time-frequency resources in the first area range that are used for laser signal transmission, the processing module 601 is specifically configured to:

use, as the third time-frequency resource, all idle time-frequency resources in the time-frequency resources in the first area range that are used for laser signal transmission; or determine idle time-frequency resources from the time-frequency resources in the first area range that are used for laser signal transmission, and select, from the idle time-frequency resources, a time-frequency resource with minimum interference as the third time-frequency resource.

For example, a time-frequency resource includes a slot identifier, a cycle, and a frequency; and for determining whether the second time-frequency resource used when the second vehicle performs laser signal transmission is the same as the first time-frequency resource, the processing module 601 is specifically configured to: determine whether a first slot identifier included in the first time-frequency resource is the same as a second slot included in the second time-frequency resource, determine whether a first cycle included in the first time-frequency resource is the same as a second cycle included in the second time-frequency resource, and determine whether a first frequency included in the first time-frequency resource is the same as a second frequency included in the second time-frequency resource; and if all of three determining results are yes, determine that the first time-frequency resource is the same as the second time-frequency resource; or if at least one of three determining results is no, determine that the first time-frequency resource is different from the second time-frequency resource.

For example, for determining the first time-frequency resource used when the first vehicle performs laser signal transmission and the first location of the first vehicle, the processing module 601 is specifically configured to:

receive, by using the receiving module 603, the first time-frequency resource used when the first vehicle performs laser signal transmission and the first location of the first vehicle, where the first time-frequency resource and the first location are reported by the first vehicle.

Figure 7:
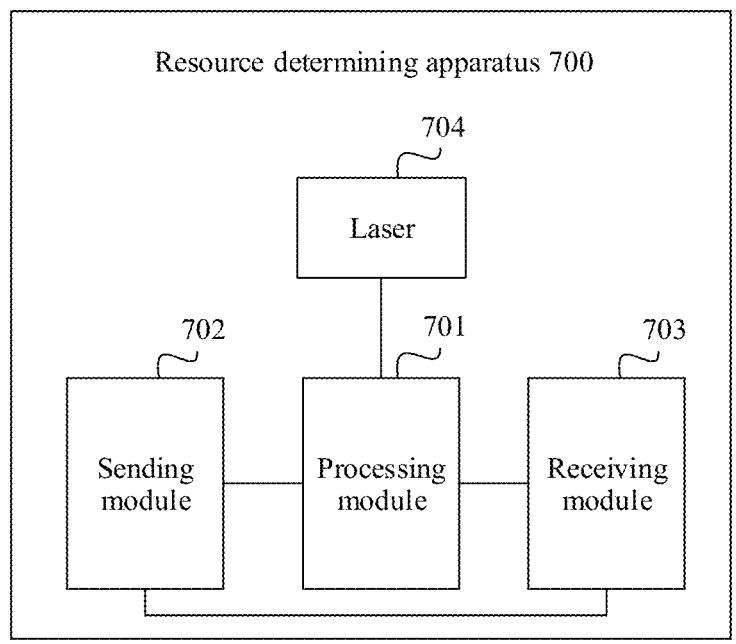
FIG. 7 is a schematic diagram of a resource determining apparatus according to an embodiment of this application.

Based on a same inventive concept as the foregoing resource determining method, as shown in FIG. 7, an embodiment of this application further provides a resource determining apparatus 700. The resource determining apparatus 700 is configured to perform operations in FIG. 2, FIG. 3, FIG. 4A, and FIG. 4B performed by the first vehicle in the foregoing resource determining method.

The resource determining apparatus 700 includes a processing module 701, a sending module 702, a receiving module 703, and a laser 704.

The processing module 701 is configured to identify a first time-frequency resource used when the apparatus performs laser signal transmission and a first location of the apparatus;

the sending module 702 is configured to send the first time-frequency resource and the first location to a server;

the receiving module 703 is configured to receive a third time-frequency resource sent by the server, where the third time-frequency resource is sent by the server to the apparatus 700 after the following case occurs: the server determines, based on the first location, a first area range in which the apparatus 700 is located; and when a second vehicle exists in the first area range, and a second time-frequency resource used when the second vehicle performs laser signal transmission is the same as the first time-frequency resource, the server determines the third time-frequency resource from time-frequency resources in the first area range that are used for laser signal transmission, where the third time-frequency resource includes an idle time-frequency resource; and the laser 704 is configured to switch from using the first time-frequency resource to perform laser signal transmission to using the third time-frequency resource to perform laser signal transmission.

For example, if the third time-frequency resource is all idle time-frequency resources in the time-frequency resources in the first area range that are used for laser signal transmission, for switching from using the first time-frequency resource to perform laser signal transmission to using the third time-frequency resource to perform laser signal transmission, the laser 704 is specifically configured to:

select a target time-frequency resource from the third time-frequency resource, and switch from using the first time-frequency resource to perform laser signal transmission to using the target time-frequency resource to perform laser signal transmission.

For example, the sending module 702 is further configured to report, to the server, the target time-frequency resource selected by the apparatus 700 to perform laser signal transmission.

Figure 8:
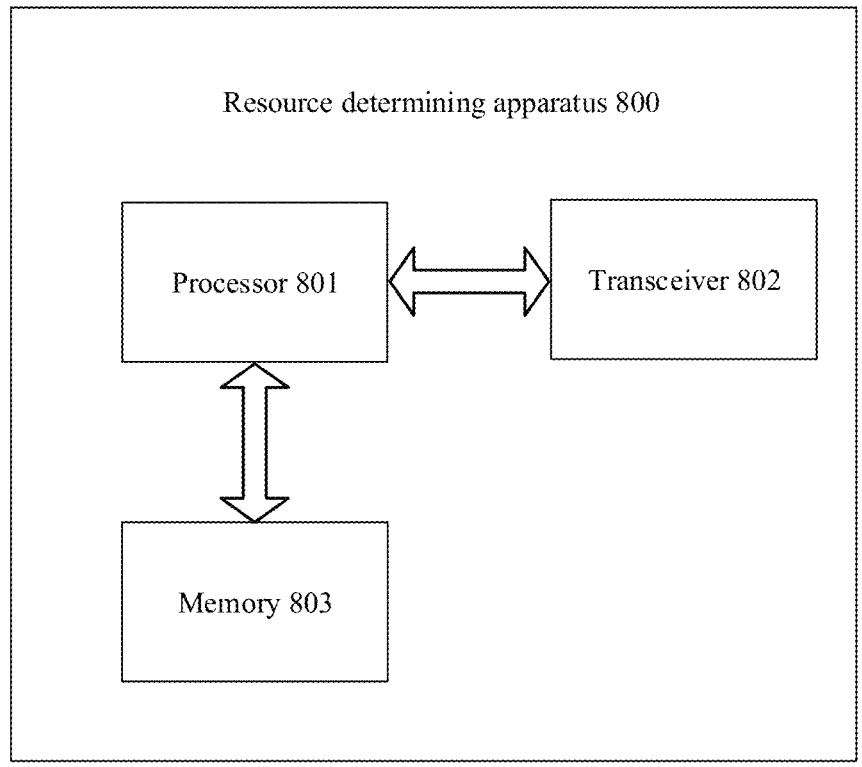
FIG. 8 is a schematic diagram of a resource determining apparatus according to an embodiment of this application.

Based on a same inventive concept as the foregoing resource determining method, as shown in FIG. 8, an embodiment of this application further provides a resource determining apparatus 800. The resource determining apparatus 800 is configured to perform operations in FIG. 2, FIG.

3, FIG. 4A, and FIG. 4B performed by the first vehicle or the server in the foregoing resource determining method.

The resource determining apparatus 800 includes a processor 801 and a transceiver 802. Optionally, the resource determining apparatus 800 further includes a memory 803. The processor 801 is configured to invoke a group of programs. When the programs are being executed, the processor 801 is enabled to perform operations performed by the first vehicle or the server in the foregoing resource determining method. The memory 803 is configured to store the programs to be executed by the processor 801. Both the processing module 601 in FIG. 6 and the processing module 701 in FIG. 7 may be implemented by the processor 801. The sending module 602 and the receiving module 603 in FIG. 6 may be implemented by the transceiver 802. The sending module 702 and the receiving module 703 in FIG. 7 may be implemented by the transceiver 802.

The processor may be a central processing unit (central processing unit, CPU), a network processor (network processor, NP), or a combination of a CPU and an NP.

The processor may further include a hardware chip or another general purpose processor. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), another programmable logic device, a discrete gate, a transistor logic device, a discrete hardware component, any combination thereof, or the like. The general purpose processor may be a microprocessor, or the processor may be any conventional processor or the like.

It may be understood that the memory mentioned in the embodiments of this application may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory described in this application includes but is not limited to these and any memory of another proper type.

An embodiment of this application provides a computer storage medium. The computer storage medium stores computer programs, and the computer programs are used for performing the foregoing resource determining method.

An embodiment of this application provides a computer program product including instructions. When the computer program product is run on a computer, the computer is enabled to perform the resource determining method provided above.

Any resource determining apparatus provided in the embodiments of this application may alternatively be a chip.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the embodiments and all changes and modifications falling within the scope of this application.

Obviously, persons skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A self-driving technology-based resource determining method, comprising:
   identifying, by a first vehicle, a first time-frequency resource used when the first vehicle performs laser signal transmission and a first location of the first vehicle;
   sending, by the first vehicle, the first time-frequency resource and the first location to a server;
   receiving, by the first vehicle and from the server, a third time-frequency resource, wherein the third time-frequency resource comprises idle time-frequency resources in time-frequency resources in a first area range that are used for laser signal transmission, and wherein the first vehicle is located in the first area range; and
   switching, by the first vehicle, from using the first time-frequency resource to perform laser signal transmission to using the third time-frequency resource to perform laser signal transmission.

2. The method according to claim 1, wherein the switching, by the first vehicle, from using the first time-frequency resource to perform laser signal transmission to using the third time-frequency resource to perform laser signal transmission comprises:
   selecting, by the first vehicle, a target time-frequency resource from the third time-frequency resource, and switching from using the first time-frequency resource to perform laser signal transmission to using the target time-frequency resource to perform laser signal transmission.

3. The method according to claim 2, further comprising:
   reporting, by the first vehicle to the server, the target time-frequency resource selected by the first vehicle to perform laser signal transmission.

4. A self-driving technology-based resource determining system, comprising a first vehicle and a server, wherein
   the first vehicle comprises at least one first processor and one or more first memories coupled to the at least one first processor and storing first programming instructions for execution by the at least one first processor to cause the first vehicle to:
      identify a first time-frequency resource used when the first vehicle performs laser signal transmission and a first location of the first vehicle; and
      send the first time-frequency resource and the first location to the server;
   the server comprises at least one second processor and one or more second memories coupled to the at least one second processor and storing second programming instructions for execution by the at least one second processor to cause the server to:
      determine, based on the first location, a first area range in which the first vehicle is located;
      when a second vehicle exists in the first area range, and a second time-frequency resource used when the second vehicle performs laser signal transmission is same as the first time-frequency resource, determine a third time-frequency resource from time-frequency resources in the first area range that are used for laser signal transmission, when the third time-frequency resource comprises idle time-frequency resources in time-frequency resources in the first area range that are used for laser signal transmission; and
      send the third time-frequency resource to the first vehicle, wherein the third time-frequency resource comprises an idle time-frequency resource; and
   wherein the first programming instructions, when executed by the at least one first processor, cause the first vehicle to:
      receive the third time-frequency resource sent by the server; and
      switch from using the first time-frequency resource to perform laser signal transmission to using the third time-frequency resource to perform laser signal transmission.

5. The system according to claim 4, wherein the first programming instructions, when executed by the at least one first processor, cause the first vehicle to:
   select a target time-frequency resource from the third time-frequency resource, and switch from using the first time-frequency resource to perform laser signal transmission to using the target time-frequency resource to perform laser signal transmission.

6. The system according to claim 5, wherein the first programming instructions, when executed by the at least one first processor, cause the first vehicle to:
   report, to the server, the target time-frequency resource selected by the first vehicle to perform laser signal transmission.

7. The method according to claim 1, wherein a second vehicle exists in the first area range, and a second time-frequency resource used when the second vehicle performs laser signal transmission is same as the first time-frequency resource.

8. A self-driving technology-based resource determining apparatus, comprising at least one processor and one or more memories coupled to the at least one processor and storing programming instructions for execution by the at least one processor to cause the apparatus to:
   identify a first time-frequency resource used when the apparatus performs laser signal transmission and a first location of the apparatus,
   send the first time-frequency resource and the first location to a server;
   receive a third time-frequency resource sent by the server, wherein the third time-frequency resource comprises idle time-frequency resources in time-frequency resources in a first area range that are used for laser signal transmission, and wherein the apparatus is located in the first area range; and
   the programming instructions, when executed by the at least one processor, cause the apparatus to:
      control a laser to switch from using the first time-frequency resource to perform laser signal transmission to using the third time-frequency resource to perform laser signal transmission.

9. The apparatus according to claim 8, wherein the programming instructions, when executed by the at least one processor, cause the apparatus to:
   select a target time-frequency resource from the third time-frequency resource, and control the laser to switch from using the first time-frequency resource to perform laser signal transmission to using the target time-frequency resource to perform laser signal transmission.

10. The apparatus according to claim 9, wherein the programming instructions, when executed by the at least one processor, cause the apparatus to:
    report, to the server, the target time-frequency resource selected by the apparatus to perform laser signal transmission.

* * * * *